US009334866B2

(12) United States Patent
Gilarranz

(10) Patent No.: US 9,334,866 B2
(45) Date of Patent: May 10, 2016

(54) SYSTEM AND APPARATUS FOR REDUCING THRUST FORCES ACTING ON A COMPRESSOR ROTOR

(75) Inventor: Jose L. Gilarranz, Katy, TX (US)

(73) Assignee: Dresser-Rand Company, Olean, NY (US)

( * ) Notice: Subject to any disclaimer, the term of this patent is extended or adjusted under 35 U.S.C. 154(b) by 459 days.

(21) Appl. No.: 13/880,794

(22) PCT Filed: Oct. 19, 2011

(86) PCT No.: PCT/US2011/056795
§ 371 (c)(1),
(2), (4) Date: Oct. 15, 2013

(87) PCT Pub. No.: WO2012/061011
PCT Pub. Date: May 10, 2012

(65) Prior Publication Data
US 2014/0030114 A1   Jan. 30, 2014

Related U.S. Application Data

(60) Provisional application No. 61/406,373, filed on Oct. 25, 2010.

(51) Int. Cl.
F04B 35/04 (2006.01)
F04D 13/06 (2006.01)
H02K 7/09 (2006.01)
F04D 29/051 (2006.01)
F04D 29/058 (2006.01)

(52) U.S. Cl.
CPC ............. F04D 13/06 (2013.01); F04D 29/051 (2013.01); F04D 29/058 (2013.01); H02K 7/09 (2013.01)

(58) Field of Classification Search
CPC ..... F04D 13/06; F04D 29/051; F04D 29/058; H02K 15/00; H02K 7/09
USPC ............................................. 417/365, 423.12
See application file for complete search history.

(56) References Cited

U.S. PATENT DOCUMENTS

| 3,221,389 | A | * | 12/1965 | Cowell | B65H 57/14 100/917 |
| 3,588,768 | A | * | 6/1971 | Baermann | H01F 7/0226 335/225 |
| 5,407,331 | A | * | 4/1995 | Atsumi | F02M 37/048 417/420 |
| 6,703,735 | B1 | * | 3/2004 | Gabrys | F16C 32/0465 310/181 |
| 7,144,226 | B2 | * | 12/2006 | Pugnet | F04D 17/125 417/244 |
| 2002/0028147 | A1 | * | 3/2002 | Gabrieli | F04D 13/026 417/365 |
| 2003/0161745 | A1 | * | 8/2003 | Kern | F04D 25/0653 417/423.7 |
| 2009/0044548 | A1 | * | 2/2009 | Masoudipour | F04D 17/122 62/115 |

* cited by examiner

Primary Examiner — Charles Freay

(57) ABSTRACT

A system and method of counterbalancing an aerodynamic thrust force generated by the impellers of a centrifugal compressor is disclosed. A rotor assembly includes a rotatable shaft disposed within a housing, and having a plurality of impellers axially-spaced from each other and coupled to the rotatable shaft for rotation therewith. Adjacent impellers along the rotatable shaft are each separated from each other with a stationary wall having one or more magnets coupled thereto. The magnets are disposed axially-adjacent a hub-side of each impeller such that the one or more magnets magnetically-attract each impeller toward the adjacent stationary wall, thereby reducing a net impeller thrust of the rotor assembly.

13 Claims, 4 Drawing Sheets ing fluid progresses axially along the compressor through the
SYSTEM AND APPARATUS FOR REDUCING THRUST FORCES ACTING ON A COMPRESSOR ROTOR The present application is a national stage application of PCT Pat. App. No. PCT/US2011/056795 filed Oct. 29, 2011, which claims priority to U.S. Provisional Patent Application Ser. No. 61/406,373, which was filed Oct. 25, 2010. These priority applications are incorporated herein in their entirety, to the extent consistent with the present application.

BACKGROUND

Centrifugal compressors generally include a shaft and one or more rotating impellers attached thereto that are configured to increase the pressure of a working fluid. As the working fluid progresses axially along the compressor through the various stages of rotating impellers, its pressure is increased. Increasing the pressure of the working fluid, however, generates a pressure differential across each impeller which applies an axial thrust in the direction opposite the axial progression of the working fluid. To ensure safe compressor operation, this force must be balanced both statically and dynamically. Typically, the axial thrust is counterbalanced by employing one or more thrust bearings, balance pistons, or a combination of both. The impeller thrust not balanced by the balance piston is generally absorbed by the axial thrust bearing.

A thrust bearing assembly usually consists of thrust bearing halves disposed about the side surfaces of a radially-extending axial bearing disk. The axial bearing disk can be machined directly on the shaft or otherwise coupled thereto by interference fit or using appropriate alternate methods. Magnetic thrust bearings, active and/or passive, are increasingly being used in centrifugal compressors. Passive magnetic thrust bearings, however, cannot be adjusted in real-time and therefore oftentimes fail to provide adequate balance during anomalous thrust loads. Active magnetic bearings, on the other hand, require a continuous power supply, an expensive feedback control module for adjusting the corresponding bearing force, and backup bearings for protecting the axial thrust bearing in the event of a power failure.

A balance piston typically includes a disk attached to the shaft behind the last impeller stage. The outboard side of the disk is subjected to a low pressure from the inlet side of the compressor or from an alternate location within an intermediate stage, thereby creating a pressure differential opposite the direction of the axial thrust created by the impellers. This pressure differential causes a force on the balance piston that counteracts some of the axial forces generated by the impellers. The pressure differential also causes some of the compressed gas from the discharge to leak through the gap that exists between the balance piston outer diameter and the balance piston seal, which is recirculated through the compressor stages, thus increasing the compressor power consumption thereby reducing system efficiency. In other embodiments, the balance piston may be disposed on the compressor shaft at alternate locations.

The thrust bearing and balance piston are oftentimes quite large and therefore occupy a large portion of the axial length of the shaft. Consequently, there is reduced axial space for additional impellers which could otherwise increase the compression capability of the unit. Also, with added mass elements along the shaft, shaft rotordynamics becomes increasingly complicated and the shaft may not be able to operate in a stable way at the required speed levels.

What is needed, therefore, is a system and method of counterbalancing thrust forces generated by centrifugal impellers of a compressor rotor, to reduce the size and weight and at the same time overcomes the disadvantages of the prior systems described above.

SUMMARY

Embodiments of the disclosure may provide a centrifugal compressor. The centrifugal compressor may include a housing having a stator defining a diffuser channel and a return channel within the housing, the stator having a stationary wall interposing the diffuser channel and the return channel, and a rotatable shaft disposed within the housing and supported at each end with one or more radial bearings. The centrifugal compressor may further include a rotor assembly having an impeller coupled to the rotatable shaft and being rotatable therewith, the impeller having a hub-side disposed axially-adjacent a stationary wall, and one or more magnets coupled to the stationary wall and configured to magnetically attract the hub-side of the impeller toward the stationary wall, thereby reducing a net impeller thrust.

Embodiments of the disclosure may also provide a method of reducing an aerodynamic thrust in a centrifugal compressor. The method may include rotating a rotor assembly having at least one impeller coupled to a rotatable shaft and configured to rotate therewith, and compressing a working fluid with the at least one impeller. The method may also include generating an aerodynamic thrust in a first direction, and magnetically-attracting the at least one impeller in a second direction opposite the first direction with a magnet coupled to a stationary wall disposed axially-adjacent the at least one impeller.

Embodiments of the disclosure may further provide a rotor assembly for a centrifugal compressor. The rotor assembly may include a rotatable shaft disposed within a housing and supported at each end with one or more radial bearings, and a plurality of impellers axially-spaced from each other and coupled to the rotatable shaft for rotation therewith, the plurality of impellers being separated from each other by a corresponding plurality of stationary walls interposed between adjacent impellers. The rotor assembly may further include one or more magnets disposed on the each stationary wall axially-adjacent a hub side of a corresponding one of the plurality of impellers, the one or more magnets being configured to magnetically-attract the hub-side of each impeller toward the corresponding stationary wall, thereby reducing a net impeller thrust of the rotor assembly.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
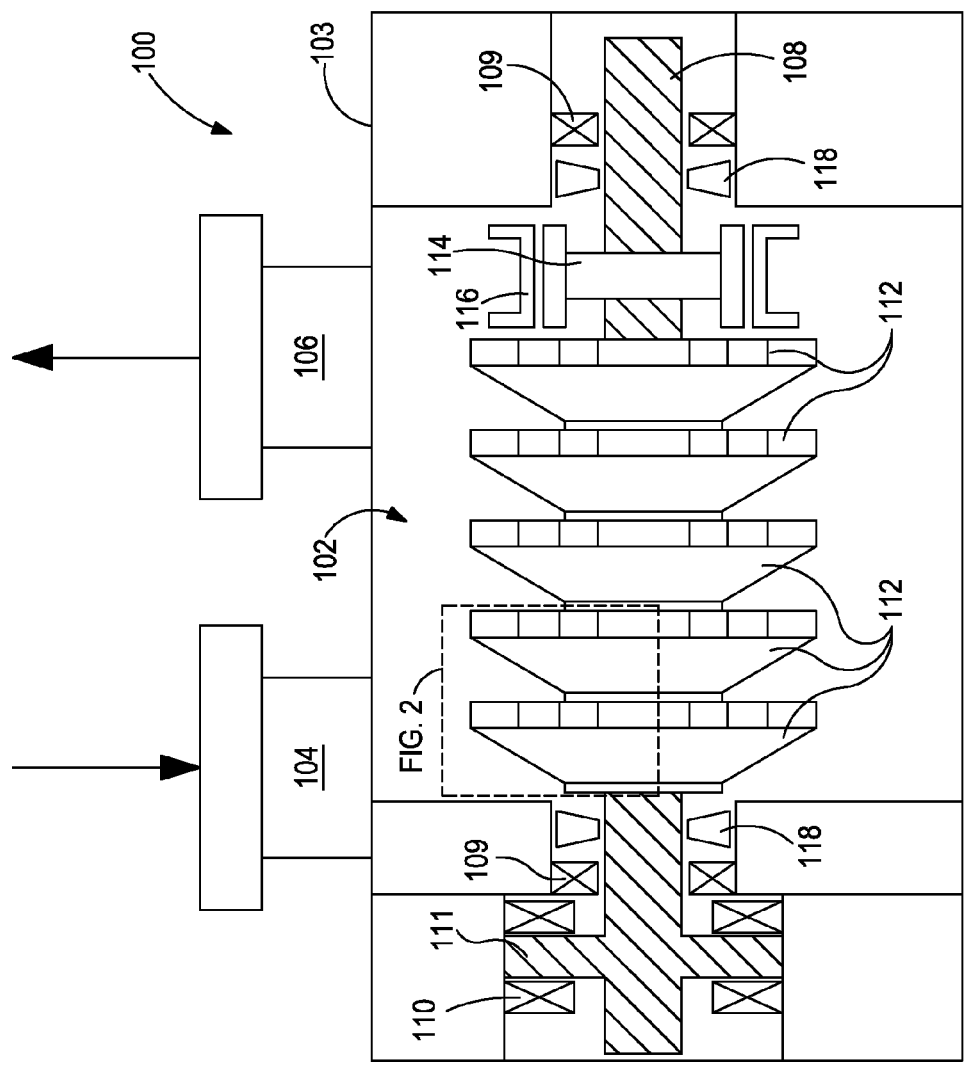
FIG. 1 illustrates a compressor having a rotor assembly disposed therein, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a compressor 100 having a rotor assembly 102 disposed therein, according to one or more embodiments disclosed. In an embodiment, the compressor 100 may be a multistage centrifugal compressor configured to progressively increase the pressure of a working fluid through one or more stages of compression. The compressor 100 includes a casing or housing 103 having an intake 104 for the introduction of a working fluid into the rotor assembly 102, and a discharge 106 for ejecting a pressurized working fluid after having been compressed in the rotor assembly 102. In at least one embodiment, the housing 103 hermetically-seals the rotor assembly 102 within the compressor 100.

A shaft 108 extends substantially the whole length of the housing 103 and is supported at each end, respectively, by one or more radial bearings 109. In one embodiment, the ends of the shaft 108 may penetrate the housing 103 on one or both ends of the housing 103 to allow the shaft 108 to be coupled to a driver at one end and potentially to additional driven equipment at the other end. The radial bearings 109 may be directly or indirectly supported by the housing 103, and in turn provide support to the shaft 108 and rotor assembly 102 during operation of the compressor 100. In one embodiment, the bearings 109 may be magnetic bearings, such as active or passive magnetic bearings. In other embodiments, however, other types of bearings 109 may be used such as, but not limited to, roller bearings, ball bearings, needle bearings, hydrodynamic bearings, hydrostatic bearings, or any combination thereof.

In addition, at least one axial thrust bearing 110 may be provided at or near at least one end of the shaft 108. The axial thrust bearing 110 may bear the axial thrusts generated by the rotor assembly 102 by providing a biasing force against a thrust disc 111. The thrust disc 111 may be coupled to or otherwise machined directly into the shaft 108. In one embodiment, the axial thrust bearing 110 is a magnetic bearing, either passive or active. In other embodiments, however, the thrust bearing 110 may be a hydrodynamic or hydrostatic bearing, or another type of bearing.

The rotor assembly 102 may include one or more (in this case five) compressor stage impellers 112 coupled to the shaft 108 and axially-spaced from each other along a section of the shaft 108. As can be appreciated, however, any number of impellers 112 may be implemented or used without departing from the scope of the disclosure. For example, as will be described in FIG. 3 below, it is contemplated to have an embodiment with a single impeller 304.

A balance piston 114, including an accompanying balance piston seal 116, may be disposed about the shaft 108 following the last impeller 112 or compressor stage. Due to the pressure rise developed through the rotor assembly 102, a pressure difference is created such that the shaft 108 experiences a net thrust in the direction of the inlet 104 of the compressor 100. The balance piston 114 serves to counteract that force, and the axial thrust that is not shouldered by the balance piston 114 is otherwise absorbed by the thrust bearing 110.

To contain the working fluid within the housing 110 and further prevent "dirty" process gas from leaking into the bearing assemblies 109, 110 or the atmosphere, the compressor 100 may also include one or more buffer seals 118. The buffer seals 118 may be radial seals disposed inboard of the radial bearings 109 about the shaft 108 at or near the respective ends of the rotor assembly 102. In one or more embodiments, the buffer seals 118 may be brush seals or labyrinth seals. In other embodiments, however, the buffer seals 118 may be dry gas seals or carbon ring seals using pressurized seal gas.

Figure 2:
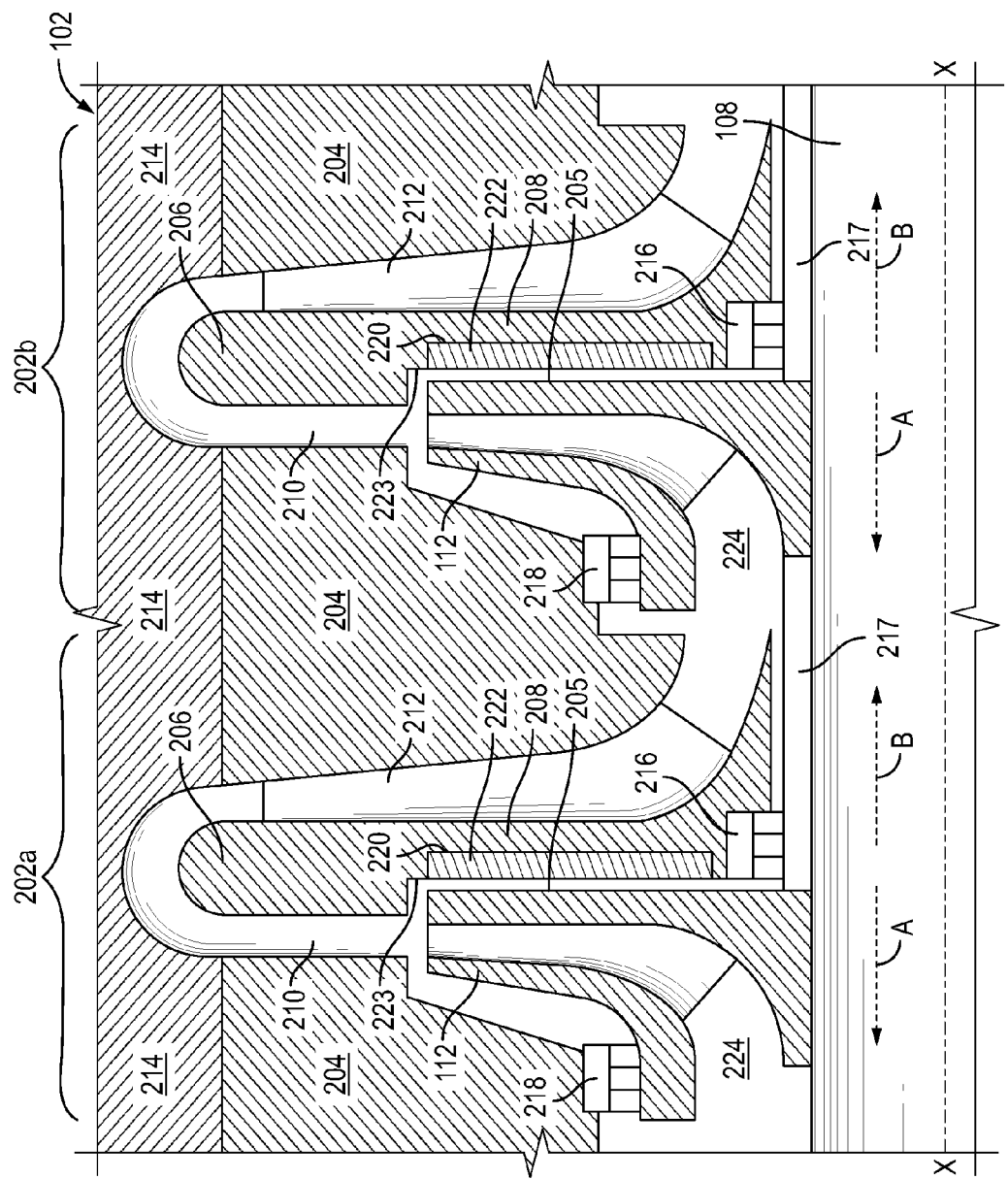
FIG. 2 illustrates a partial view of the rotor assembly shown in FIG. 1.

Referring now to FIG. 2, illustrated is a sectional view of the rotor assembly 102, as indicated by the dashed box shown in FIG. 1. As depicted in FIG. 2, two impeller stages 202a and 202b are shown as forming part of the rotor assembly 102. Each impeller stage 202a,b includes an impeller 112 mounted to the shaft 108 for rotation therewith about a central axis X. The impellers 112 rotate with respect to a stator 204 that forms part of the housing 103 (FIG. 1). The stator 204 may include or otherwise define a diaphragm bulb 206 and a diffuser or stationary wall 208 disposed axially-adjacent the hub-side 205 of each impeller 112. The combination of the stator 204, the diaphragm bulb 206, and the stationary wall 208 behind the impeller 112 may form or otherwise define a diffuser channel 210 and a return channel 212 for receiving and routing compressed working fluid to a succeeding impeller stage 202a,b. A return bend ring 214 may also form part of the stator 204 and/or housing 103 (FIG. 1) and further help define the diffuser channel 210.

One or more shaft seals 216 may be coupled or otherwise attached to the stationary wall 208 adjacent the shaft 108 or otherwise adjacent an impeller spacer 217 disposed about the shaft 108. Each shaft seal 216 may be configured to prevent the regression of compressed working fluid axially along the shaft 108 toward the inlet 104 (FIG. 1). Moreover, one or more impeller eye seals 218 may be coupled or otherwise attached to the stator 204 adjacent a fluid inlet or "eye" 224 of each impeller 112. The impeller eye seals 218 may likewise be configured to prevent the regression of compressed working fluid toward the inlet 104 (FIG. 1) and therefore to preceding uncompressed stages 202*a,b*. In some embodiments, part of the impeller eye seal 218 may form a portion of the impeller 112.

As illustrated, each stationary wall 208 may define one or more slots 220 configured to receive and seat at least one magnet 222 therein. The slot(s) 220 may be milled or otherwise machined into the stationary wall 208 to a depth sufficient to seat the magnet(s) 222 flush with the unmilled portion 223 (i.e., the outer surface) of the stationary wall 208. In at least one embodiment, the slot 220 may be a singular annular channel defined in the stationary wall 208. In other embodiments, however, the slot 220 may include a plurality of slots 220 equidistantly or otherwise intermittently spaced from each other about the circumference of the shaft 108. In yet other embodiments, the slot 220 is omitted and the magnet 222 may instead be coupled directly to the outer surface 223 of the stationary wall 208.

In one embodiment, the magnet 222 is a permanent magnet, such as but not limited to a rare earth magnet made from alloys of rare earth metals. In other embodiments, however, the magnet 222 may be an electromagnet powered and regulated by an external power source (not shown). In embodiments where the magnets 222 are electromagnets, the magnets 222 do not necessarily need to be actively controlled during normal operation. Thus, the cost of the overall compressor system 100 is generally not increased.

The magnet 222 may be seated and secured within the slot 220 by various methods. In one embodiment, the magnet 222 is mechanically-attached within to the slot 220 using a mechanical attachment device, such as a bolt, screw, or other mechanical fastener. In another embodiment, the magnet 222 may be seated within the slot 220 and a shroud (not shown) may subsequently be bolted to the stationary wall 208; the shroud being adapted to hold or otherwise maintain the magnet within the slot 220. In yet another embodiment, the magnet 222 may be welded, brazed, or adhesively attached within the slot 220, or any combinations thereof. In yet other embodiments, the magnet 222 may be seated within the slot 220 and the magnetic attraction forces generated by the magnet 222 itself may be sufficient to hold the magnet 222 within the slot 220, even during operation of the compressor 100 (FIG. 1).

As the working fluid is compressed through each stage 202*a,b*, an aerodynamic thrust is generated in the general direction of the inlet 104 of the compressor 100, or a first direction depicted by arrows A. Consequently, the shaft 108 is also forced in the first direction A. According to the disclosure, each magnet 222 may be configured to reduce the aerodynamic thrust by providing magnetic attractive forces in a generally opposing or second direction, as depicted by arrows B. Specifically, the magnetic attractive forces generated by each magnet 222 may be configured to exert a drawing or pulling force on the hub-side 205 of each respective impeller 112 in the second direction B, thereby counteracting the aerodynamic thrust in the first direction. Accordingly, each magnet 222 may act as a localized thrust bearing behind each impeller 112, serving to stabilize or otherwise reduce the overall thrust generated by the rotor assembly 102.

As can be appreciated, using the magnets 222 to reduce the overall thrust generated by the rotor assembly 102 may provide several advantages. For example, the magnetic attractive force of the magnets 222 equates to less dependence on the balance piston 114 and thrust bearing 110 (FIG. 1) to shoulder the full load of the aerodynamic thrust in the first direction A. Consequently, the balance piston 114 and axial thrust bearing 110 assemblies may be significantly reduced in size. Specifically, the diameter of the balance piston 114 drum may be reduced, thereby reducing the amount of gas recirculated through the compressor 100 (i.e., gas that leaks through the gap between the balance piston 114 and its seal 116). Reducing the size of the balance piston 114 may also allow for the use of alternative concepts for sealing the pressure difference generated in the rotor assembly 102. For example, a smaller balance piston 114 may allow for the implementation of more efficient seals such as carbon ring seals at the location of the balance piston seal 116.

In at least one embodiment, the magnetic attractive force of the magnets 222 in the second direction B may be sufficiently strong such that the balance piston 114 may be eliminated altogether, thereby freeing up valuable shaft 108 length. The excess shaft 108 length may provide room to add an additional impeller stage 202*a,b* and thereby augment the compression capability of the compressor 100. Otherwise, excess shaft 108 length that would have otherwise been used to accommodate the balance piston 114 assembly may be removed altogether to provide a shorter and lighter shaft 108. As can be appreciated, a shorter and lighter shaft 108 may improve rotordynamic behavior of the compressor 100.

The magnetic attractive force of the magnets 222 in the second direction B may also reduce the required capacity of the thrust bearing 110, thereby allowing for a reduced-size thrust disc 111. The excess shaft 108 length may again be removed to provide a shorter and lighter shaft 108. Moreover, reducing the size of the thrust disc 111 and accompanying thrust bearing 110 may also result in a reduction of windage losses via the thrust bearing 110 and/or thrust disc 111. For example, reducing the diameter of the thrust disc 111 may equate to a proportional reduction in the parasitic or viscous windage losses and the power consumption that would otherwise be required to overcome such losses.

Figure 3:
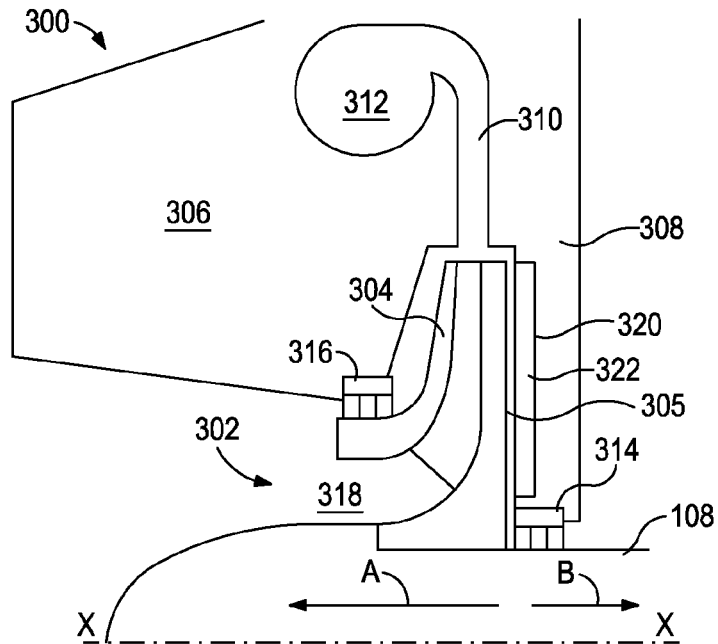
FIG. 3 illustrates another embodiment of a rotor assembly, according to one or more embodiments disclosed.

Referring now to FIG. 3, illustrated is another exemplary embodiment of a rotor assembly 302, according to one or more embodiments disclosed. The rotor assembly 302 may be disposed within a single stage centrifugal compressor unit 300. The compressor 300 may be a Pipeline Direct Inlet centrifugal compressor manufactured by and commercially-available through Dresser-Rand® Company. It will be appreciated, however, that the rotor assembly 302 may be employed in any single stage, axial inlet compressor, without departing from the scope of the disclosure.

As illustrated, the rotor assembly 302 may include an impeller 304 coupled to the shaft 108 and configured to rotate therewith about the central axis X. The compressor 300 may include a stator 306 having a stationary wall 308 forming part thereof, wherein the stationary wall 208 is axially-adjacent a hub-side 305 of the impeller 304. The stator 306 and stationary wall 308 may together define a diffuser 310 and volute 312 for the receipt and proper handling of compressed working fluid from the impeller 304. Similar to the rotor assembly 102 of FIGS. 1 and 2, the rotor assembly 302 of FIG. 3 may include one or more shaft seals 314 coupled or otherwise attached to the stationary wall 308 adjacent the shaft 108, and one or more impeller seals 316 coupled or otherwise attached to the stator 306 adjacent a fluid inlet or "eye" 318 of the impeller 304.

The stationary wall 308 may define one or more slots 320 configured to receive and seat at least one magnet 322 therein. The slot 320 and magnet 322 may be substantially similar to the slot 220 and magnet 222 described above with reference to FIG. 2, and therefore will not be discussed again in detail. As the working fluid is compressed with the impeller 304, an aerodynamic thrust is generated in the general direction of the inlet 318, or a first direction as shown by arrow A. Consequently, the shaft 108 is also forced in the first direction A. During operation of the compressor 300, the magnet 322 may be configured to magnetically attract or otherwise draw the hub-side 305 of the impeller 304 toward the magnet 322 in a generally opposing second direction, as depicted by arrow B. Consequently, by pulling the impeller 112 in the second direction B, the magnet 322 reduces the net impeller thrust in the first direction A. Consequently, the magnet 322 at least partially counteracts the aerodynamic thrust generated by the rotor assembly 302.

Similar to the embodiments discussed with reference to FIG. 2, the magnetic attractive force of the magnet 322 in the second direction B equates to less dependence on any balance piston and/or thrust bearing assemblies to shoulder the full load of the aerodynamic thrust in the first direction A. Accordingly, any balance piston and axial thrust bearing assemblies used with the compressor 300 may be significantly reduced in size. Moreover, a shorter and lighter shaft 108 may be used, thereby augmenting the mechanical performance of the compressor 300.

Figure 4:
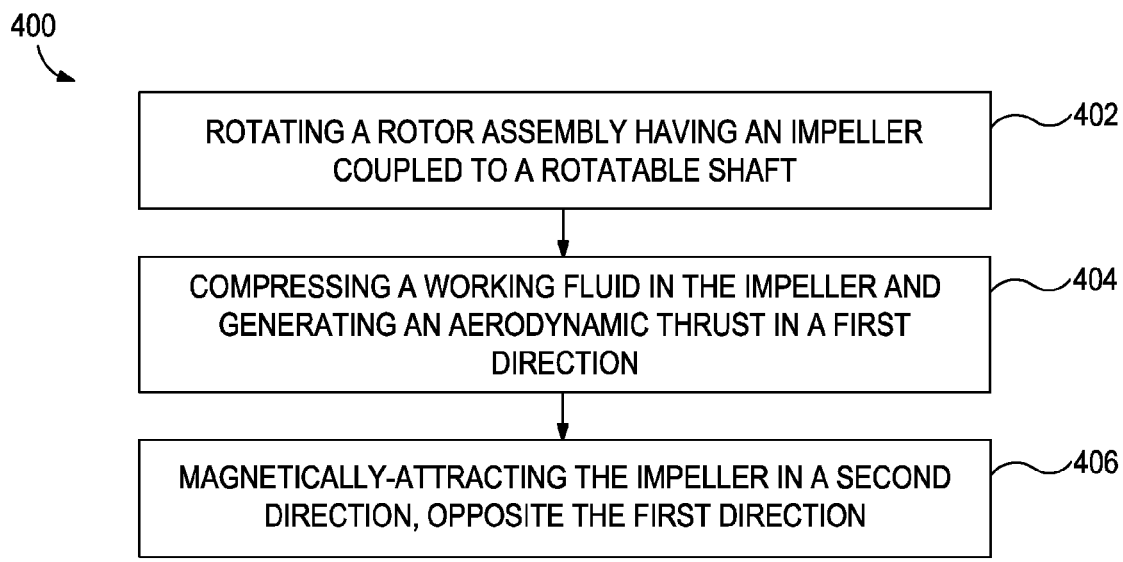
FIG. 4 illustrates a schematic method of reducing aerodynamic thrust generated by a rotor assembly, according to one or more embodiments disclosed.

Referring now to FIG. 4, illustrated is a schematic of a method 400 of reducing the aerodynamic thrust generated by the rotor assembly of a centrifugal compressor. The rotor assembly having at least one impeller coupled to a rotatable shaft may be rotated, as at 402. The rotor assembly may be disposed within a compressor, such as a centrifugal compressor having one or more compression stages, where the at least one impeller may form part of a compression stage. A working fluid may be introduced into the impeller of the rotor assembly to compress the working fluid, thereby generating an aerodynamic thrust in a first direction, as at 404. The impeller may be magnetically-attracted in a second direction opposite the first direction, as at 406. To accomplish this, a magnet (permanent magnet or electromagnet) may be disposed within a stationary wall disposed axially-adjacent the hub-side of the impeller. Ferromagnetic attraction forces generated by the magnet tends to pull or draw the impeller toward the diffuser wall, thereby reducing the aerodynamic thrust in the first direction and the net thrust of the rotor assembly.

Figure 5:
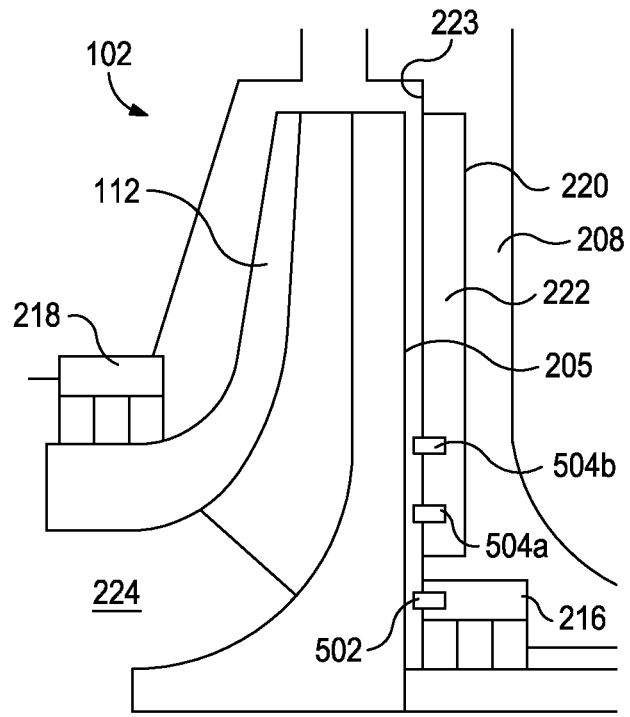
FIG. 5 illustrates a partial view of the rotor assembly shown in FIG. 2, according to one or more embodiments disclosed.

FIG. 5 illustrates a partial view of the rotor assembly 102 shown in FIG. 2, according to one or more embodiments. In at least one embodiment, the shaft seal 216 may include a shaft seal extension 502 coupled thereto or integral therewith. The shaft seal extension 502 may extend the surface of the shaft seal 216 such that the shaft seal extension 502 provides a rub-ring that extends from the stationary wall 208 behind the impeller 112. The shaft seal extension 502 may be configured to limit the axial movement of the rotor, and thereby the impeller 112, thus preventing the impeller 112 from contacting the magnet 222 and/or the stationary wall 208, for example, during assembly, disassembly, service, and/or operation. The shaft seal extension 502 may be made of non-magnetic material, such as a polymer-based material or aluminum.

One or more rings 504a, 504b (two are shown) may be coupled to or integral with the magnet 222 positioned behind the impeller 112. The rings 504a, 504b may be full rings, segmented ring portions, or cylindrical stubs. The rings 504a, 504b may be configured to limit the axial movement of the rotor, and thereby the impeller 112, thus preventing the impeller 112 from contacting the magnet 222 and/or the stationary wall 208, for example, during assembly, disassembly, service, and/or operation. The rings 504a, 504b may be made of non-magnetic material, such as a polymer-based material or aluminum.

Figure 6:
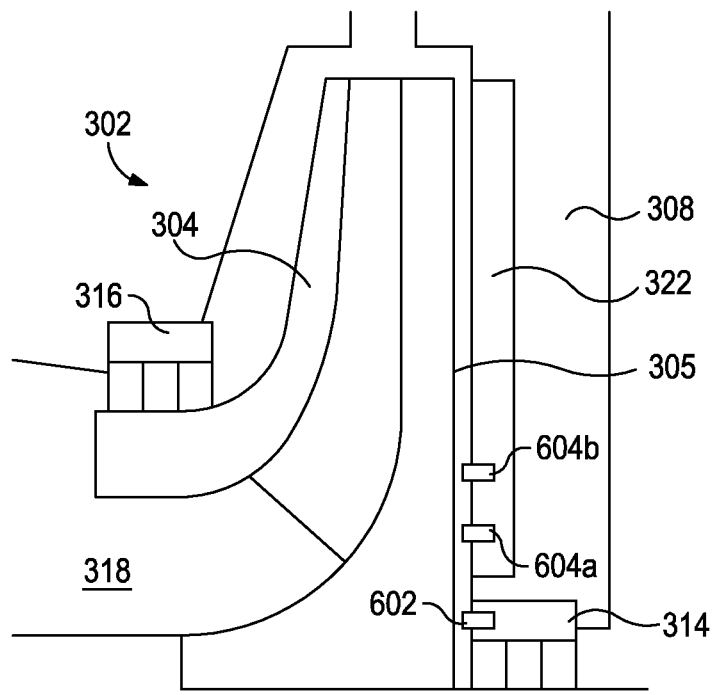
FIG. 6 illustrates a partial view of the rotor assembly shown in FIG. 3, according to one or more embodiments disclosed.

FIG. 6 illustrates a partial view of the rotor assembly 302 shown in FIG. 3, according to one or more embodiments. In at least one embodiment, the shaft seal 314 may include a shaft seal extension 602 coupled thereto or integral therewith. The shaft seal extension 602 may extend the surface of the shaft seal 314 such that the shaft seal extension 602 provides a rub-ring that extends from the stationary wall 308 behind the impeller 304. The shaft seal extension 602 may be configured to limit the axial movement of the rotor, and thereby the impeller 304, thus preventing the impeller 304 from contacting the magnet 322 and/or the stationary wall 308, for example, during assembly, disassembly, service, and/or operation. The shaft seal extension 602 may be made of non-magnetic material, such as a polymer-based material or aluminum.

One or more rings 604a, 604b (two are shown) may be coupled to or integral with the magnet 322 positioned behind the impeller 304. The rings 604a, 604b may be full rings, segmented ring portions, or cylindrical stubs. The rings 604a, 604b may be configured to limit the axial movement of the rotor, and thereby the impeller 304, thus preventing the impeller 304 from contacting the magnet 322 and/or the stationary wall 308, for example, during assembly, disassembly, service, and/or operation. The rings 604a, 604b may be made of non-magnetic material, such as a polymer-based material or aluminum.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A centrifugal compressor, comprising:
   a housing having a stator defining a diffuser channel and a return channel within the housing, the stator having a stationary wall interposing the diffuser channel and the return channel;
   a rotatable shaft having a main portion connecting a first end and a second end, wherein the main portion is disposed within the housing and at least one end extends from the housing to allow the rotatable shaft to be coupled to an external driver, the rotatable shaft supported at each end with one or more radial bearings;
   a rotor assembly having an impeller coupled to the rotatable shaft and being rotatable therewith, the impeller having a hub-side disposed axially-adjacent a stationary wall; and one or more magnets coupled to the stationary wall and configured to magnetically attract the hub-side of the impeller toward the stationary wall, thereby reducing a net impeller thrust, wherein magnetic attraction forces generated by the one or more magnets hold the one or more magnets within a slot defined in the stationary wall.

2. The compressor of claim 1, wherein the stator defines a plurality of diffuser channels and a plurality of return channels, the stator having a corresponding stationary wall interposing each diffuser channel and return channel.

3. The compressor of claim 2, further comprising a plurality of impellers axially-spaced from each other and coupled to the rotatable shaft, wherein each impeller is axially-adjacent the corresponding stationary wall and each corresponding stationary wall has at least one magnet coupled thereto for magnetically-attracting the hub-side of each impeller.

4. The compressor of claim 1, wherein the one or more magnets are rare earth magnets.

5. The compressor of claim 1, wherein the one or more magnets are passive or actively-controlled electromagnets.

6. The compressor of claim 1, wherein the one or more magnets are seated within the slot so as to be flush with an outer surface of the stationary wall.

7. A method of reducing an aerodynamic thrust in a centrifugal compressor, comprising:

rotating a rotor assembly having at least one impeller disposed within a housing, the at least one impeller coupled to a rotatable shaft and configured to rotate therewith, wherein the rotatable shaft comprises at least one end extending from the housing and coupled to an external driver, such that the rotatable shaft is rotated by the external driver;

compressing a working fluid with the at least one impeller;

generating an aerodynamic thrust in a first direction; and magnetically attracting the at least one impeller in a second direction opposite the first direction with a magnet coupled to a stationary wall disposed axially-adjacent the at least one impeller, wherein magnetic attraction forces generated by the magnet hold the magnet within a slot defined in the stationary wall.

8. The method of claim 7, further comprising disposing the magnet within the slot such that the magnet is flush with the stationary wall.

9. A rotor assembly for a centrifugal compressor, comprising:

a rotatable shaft having a main portion connecting a first end and a second end, wherein the main portion is disposed within the housing and at least one end extends from the housing to allow the rotatable shaft to be coupled to an external driver, the rotatable shaft supported at each end with one or more radial bearings;

a plurality of impellers axially-spaced from each other and coupled to the rotatable shaft for rotation therewith, the plurality of impellers being separated from each other by a corresponding plurality of stationary walls interposed between adjacent impellers; and one or more magnets disposed on each stationary wall axially-adjacent a hub side of a corresponding one of the plurality of impellers, the one or more magnets being configured to magnetically-attract the hub-side of each impeller toward the corresponding stationary wall, thereby reducing a net impeller thrust of the rotor assembly, wherein magnetic attraction forces generated by the one or more magnets hold at least one of the one or more magnets within a slot defined in the stationary wall.

10. The rotor assembly of claim 9, further comprising a shaft seal coupled to at least one of the stationary walls adjacent the shaft.

11. The rotor assembly of claim 10, further comprising a shaft seal extension extending from the shaft seal and configured to prevent the plurality of impellers from contacting the one or more magnets.

12. The rotor assembly of claim 9, further comprising one or more rings coupled to the one or more magnets and configured to prevent the plurality of impellers from contacting the one or more magnets.

13. The rotor assembly of claim 9, wherein the slot is a singular annular channel defined in the stationary wall.

* * * * *